(12) United States Patent
Ding et al.

(10) Patent No.: US 9,983,899 B2
(45) Date of Patent: May 29, 2018

(54) NETWORK RESOURCE CONFIGURATION FOR A VIRTUAL MACHINE

(71) Applicant: Huawei Technologies Co., Ltd., Shenzhen (CN)

(72) Inventors: Tianhong Ding, Hangzhou (CN); Yang Lin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 155 days.

(21) Appl. No.: 15/058,829

(22) Filed: Mar. 2, 2016

(65) Prior Publication Data

US 2016/0179567 A1  Jun. 23, 2016

Related U.S. Application Data

(63) Continuation of application No. PCT/CN2014/082319, filed on Jul. 16, 2014.

(30) Foreign Application Priority Data

Sep. 2, 2013  (CN) .......................... 2013 1 0392994

(51) Int. Cl.
*G06F 9/455* (2018.01)
*G06F 9/46* (2006.01)
(Continued)

(52) U.S. Cl.
CPC ........ *G06F 9/45558* (2013.01); *G06F 9/5077* (2013.01); *G06F 2009/4557* (2013.01);
(Continued)

(58) Field of Classification Search
None
See application file for complete search history.

(56) References Cited

U.S. PATENT DOCUMENTS 8,208,396 B2  6/2012 Eisenhauer et al.
9,008,085 B2 * 4/2015 Kamble ................ G06F 13/385
370/389

(Continued)

FOREIGN PATENT DOCUMENTS

CN    102790777 A    11/2012
CN    102932174 A    2/2013
(Continued)

OTHER PUBLICATIONS

Partial English Translation and Abstract of Chinese Patent Application No. CN103473136, Part 1, Mar. 7, 2016, 8 pages.
(Continued)

*Primary Examiner* — Bradley Teets
(74) *Attorney, Agent, or Firm* — Conley Rose, P.C.

(57) ABSTRACT

A resource configuration method of a virtual machine and a communications device. When an actual requirement of the virtual machine for the network resource is dynamically changed, the communications device may dynamically configure a communication manner corresponding to the virtual machine such that a virtual machine with a relatively low requirement for the network resource may use the manner of sharing the physical network interface card, and a virtual machine with a relatively high requirement for the network resource may use the pass-through manner, which does not cause a situation in which network resources of some virtual machines are wasted and network resources of some virtual machines are insufficient. As a result, network resources of virtual machines are properly allocated.

15 Claims, 7 Drawing Sheets

(51) Int. Cl.
 *G06F 9/50* (2006.01)
 *H04W 72/04* (2009.01)
 *H04W 28/06* (2009.01)

(52) U.S. Cl.
 CPC ... *G06F 2009/45595* (2013.01); *H04W 28/06* (2013.01); *H04W 72/04* (2013.01)

(56) References Cited

U.S. PATENT DOCUMENTS

| | | | |
|---|---|---|---|
| 2008/0002739 A1* | 1/2008 | Droux | H04L 41/0896 |
| | | | 370/468 |
| 2010/0257269 A1 | 10/2010 | Clark | |
| 2010/0281482 A1 | 11/2010 | Pike et al. | |
| 2011/0035494 A1 | 2/2011 | Pandey et al. | |
| 2011/0292792 A1 | 12/2011 | Zuo et al. | |
| 2012/0159484 A1 | 6/2012 | Benari | |
| 2012/0246644 A1* | 9/2012 | Hattori | G06F 9/4411 |
| | | | 718/1 |
| 2012/0254862 A1* | 10/2012 | Dong | G06F 9/4856 |
| | | | 718/1 |
| 2012/0284712 A1* | 11/2012 | Nimmagadda | G06F 9/5077 |
| | | | 718/1 |
| 2013/0254767 A1* | 9/2013 | Mizuno | G06F 9/455 |
| | | | 718/1 |
| 2014/0123140 A1* | 5/2014 | Motoki | H04L 41/0806 |
| | | | 718/1 |
| 2015/0029848 A1* | 1/2015 | Jain | H04L 47/125 |
| | | | 370/235 |
| 2015/0058847 A1* | 2/2015 | Zheng | H04L 47/56 |
| | | | 718/1 |
| 2015/0113114 A1 | 4/2015 | Zhang et al. | |
| 2015/0207678 A1 | 7/2015 | Li et al. | |
| 2015/0215207 A1* | 7/2015 | Qin | H04L 12/4625 |
| | | | 370/392 |
| 2016/0350151 A1* | 12/2016 | Zou | G06F 9/45558 |

FOREIGN PATENT DOCUMENTS

| | | |
|---|---|---|
| CN | 103049331 A | 4/2013 |
| CN | 103139039 A | 6/2013 |
| CN | 103473136 A | 12/2013 |
| WO | 2012151392 A1 | 11/2012 |

OTHER PUBLICATIONS

Partial English Translation and Abstract of Chinese Patent Application No. CN103473136, Part 2, Mar. 7, 2016, 4 pages.
Foreign Communication From a Counterpart Application, Chinese Application No. 201310392994.1, Chinese Office Action dated Feb. 1, 2016, 6 pages.
Foreign Communication From a Counterpart Application, PCT Application No. PCT/CN2014/082319, English Translation of International Search Report dated Oct. 9, 2014, 2 pages.
Foreign Communication From a Counterpart Application, PCT Application No. PCT/CN2014/082319, English Translation of Written Opinion dated Oct. 9, 2014, 10 pages.

* cited by examiner

NETWORK RESOURCE CONFIGURATION FOR A VIRTUAL MACHINE

CROSS-REFERENCE TO RELATED APPLICATIONS

This application is a continuation of International Application No. PCT/CN2014/082319, filed on Jul. 16, 2014, which claims priority to Chinese Patent Application No. 201310392994.1, filed on Sep. 2, 2013, both of which are hereby incorporated by reference in their entireties.

TECHNICAL FIELD

The present disclosure relates to the field of communications technologies, and in particular, to a resource configuration method of a virtual machine and a communications device.

BACKGROUND

Virtualization is a hot technology in an existing data center. Virtualization technologies for a central processing unit (CPU) and a memory are rapidly developing. However, input/output (IO) virtualization relatively lags behind, which becomes a performance bottleneck of rapid development of the virtualization technologies. Many hardware manufacturers put forward and use different solutions for the IO virtualization technology.

Now, some new virtualization technologies are constantly applied to a physical network interface card of a communications device. For example, a single-root IO virtualization (SR-IOV) technology and a virtual machine device queue (VMDQ) use a pass-through technology, that is, a physical network interface card is directly mapped to a virtual machine, and the virtual machine loads a driver of the physical network interface card. However, a physical network interface card used by a virtual machine in this manner loses its sharing capability, and becomes an exclusive device of the virtual machine. If a quantity of virtual machines is less than a quantity of physical network interface cards, network performance of the communications device can be maximized. If the quantity of virtual machines is greater than the quantity of physical network interface cards, a virtual machine that cannot correspond to a physical network interface card needs to share the physical network interface card using the conventional Open vSwitch (OVS) or in a bridging manner, and physical network interface cards corresponding to these virtual machines are configured in a process of creating the virtual machines.

Because in practical application, a requirement of a virtual machine for a network resource is dynamically changed, when a manner of configuration at the beginning of creating the virtual machine is used, it is possible to cause a situation in which network resources of some virtual machines are insufficient and network resources of some virtual machines are surplus, resulting in improper resource allocation.

SUMMARY

Embodiments of the present disclosure provide a resource configuration method of a virtual machine and a communications device, which avoids a problem that network resources of some virtual machines are insufficient, and network resources of some virtual machines are surplus.

A first aspect of an embodiment of the present disclosure provides a resource configuration method of a virtual machine, including acquiring requirement indication information of a virtual machine of a communications device for a network resource, configuring the virtual machine whose requirement indication information meets a preset pass-through condition as a virtual machine using a pass-through technology, and configuring the virtual machine whose requirement indication information does not meet the preset pass-through condition as a virtual machine sharing a physical network interface card.

In a first possible implementation manner of the first aspect of the present disclosure the acquiring requirement indication information of a virtual machine of a communications device for a network resource further includes acquiring network traffic or load of the virtual machine, and the preset pass-through condition includes the network traffic or the load of the virtual machine is greater than a first threshold, or the acquiring requirement indication information of a virtual machine of a communications device for a network resource further includes acquiring network traffic or load of each virtual machine of multiple virtual machines, and sorting the network traffic or the load of all the virtual machines in descending order, and the preset pass-through condition includes, of the multiple virtual machines, N virtual machines whose network traffic or load ranks ahead use the pass-through technology, or the acquiring requirement indication information of a virtual machine of a communications device for a network resource further includes acquiring network traffic or load of the virtual machine, and calculating a hash value corresponding to the network traffic or the load of the virtual machine, and the preset pass-through condition includes the hash value corresponding to the network traffic or the load of the virtual machine is greater than a second threshold.

With reference to the first aspect of the embodiment of the present disclosure or the first possible implementation manner of the first aspect, in a second possible implementation manner of the first aspect of the embodiment of the present disclosure, if it is determined that the requirement indication information of the virtual machine meets the preset pass-through condition, the configuring the virtual machine whose requirement indication information meets a preset pass-through condition as a virtual machine using a pass-through technology further includes determining whether a current communication manner of the virtual machine is a pass-through manner. If it is not a pass-through technology, allocating a corresponding physical network interface card to the virtual machine, and changing a hardware network resource in a configuration file of the virtual machine to a resource of the allocated physical network interface card.

With reference to the first aspect of the embodiment of the present disclosure or the first possible implementation manner of the first aspect, in a third possible implementation manner of the first aspect of the embodiment of the present disclosure, if it is determined that the requirement indication information of the virtual machine does not meet the preset pass-through condition, the configuring the virtual machine whose requirement indication information does not meet the preset pass-through condition as a virtual machine sharing a physical network interface card further includes determining whether the current communication manner of the virtual machine is a manner of sharing the physical network interface card. If it is not sharing the physical network interface card, changing the hardware network resource in the configuration file of the virtual machine to a resource of a shared physical network interface card.

With reference to the third possible implementation manner of the first aspect of the embodiment of the present disclosure, in a fourth possible implementation manner of the first aspect of the embodiment of the present disclosure, before the changing the hardware network resource in the configuration file of the virtual machine to a resource of a shared physical network interface card, the method further includes selecting, for the virtual machine, a physical network interface card whose network traffic or load is less than or equal to a preset value to perform sharing, and the preset policy includes the changing the hardware network resource in the configuration file of the virtual machine to a resource of a shared physical network interface card further includes changing the hardware network resource in the configuration file of the virtual machine to a resource of the selected shared physical network interface card.

With reference to the first aspect of the embodiment of the present disclosure, or any one of the first to the fourth possible implementation manners of the first aspect, in a fifth possible implementation manner of the first aspect of the embodiment of the present disclosure, before the acquiring requirement indication information of a virtual machine of a communications device for a network resource, the method further includes setting an initial value of the requirement indication information corresponding to the virtual machine, configuring the virtual machine whose initial value of the requirement indication information meets the preset pass-through condition as the virtual machine using the pass-through technology, and configuring the virtual machine whose initial value of the requirement indication information does not meet the preset pass-through condition as the virtual machine sharing the physical network interface card.

A second aspect of an embodiment of the present disclosure provides a communications device, and the communications device further includes an indication information acquiring unit, a first configuration unit, and a second configuration unit, where the indication information acquiring unit is configured to acquire requirement indication information of the virtual machine for a network resource, the first configuration unit is configured to configure the virtual machine whose requirement indication information acquired by the indication information acquiring unit meets a preset pass-through condition as a virtual machine using a pass-through technology, and the second configuration unit is configured to configure the virtual machine whose requirement indication information acquired by the indication information acquiring unit does not meet the preset pass-through condition as a virtual machine sharing a physical network interface card.

In a first possible implementation manner of the second aspect of the embodiment of the present disclosure the indication information acquiring unit is further configured to acquire network traffic or load of the virtual machine, and the preset pass-through condition includes the network traffic or the load of the virtual machine is greater than a first threshold, or the indication information acquiring unit is further configured to acquire network traffic or load of each virtual machine, and sort the network traffic or the load of all the virtual machines in descending order, and the preset pass-through condition includes, of the multiple virtual machines, N virtual machines whose network traffic or load ranks ahead use the pass-through technology, or the indication information acquiring unit is further configured to acquire network traffic or load of the virtual machine, and calculate a hash value corresponding to the network traffic or the load of the virtual machine, and the preset pass-through condition includes the hash value corresponding to the network traffic or the load of the virtual machine is greater than a second threshold.

With reference to the second aspect of the embodiment of the present disclosure or the first possible implementation manner of the second aspect, in a second possible implementation manner of the second aspect of the embodiment of the present disclosure, the first configuration unit further includes a pass-through condition determining unit configured to determine whether the requirement indication information of the virtual machine meets the preset pass-through condition, a pass-through communication manner determining unit configured to, when the pass-through condition determining unit determines that the requirement indication information of the virtual machine meets the preset pass-through condition, determine whether a current communication manner of the virtual machine is a pass-through manner, and a pass-through configuration unit configured to, when the pass-through communication manner determining unit determines that the current communication manner of the virtual machine is not the pass-through manner, allocate a corresponding physical network interface card to the virtual machine, and change a hardware network resource in a configuration file of the virtual machine to a resource of the allocated physical network interface card.

With reference to the second aspect of the embodiment of the present disclosure or the first possible implementation manner of the second aspect, in a third possible implementation manner of the second aspect of the embodiment of the present disclosure, the second configuration unit further includes a shared communication manner determining unit configured to, when the pass-through condition determining unit determines that the requirement indication information of the virtual machine does not meet the preset pass-through condition, further determine whether the current communication manner of the virtual machine is a manner of sharing the physical network interface card, and a shared configuration unit configured to, when the shared communication manner determining unit determines that the current communication manner of the virtual machine is not the manner of sharing the physical network interface card, change the hardware network resource in the configuration file of the virtual machine to a resource of a shared physical network interface card.

With reference to the third possible implementation manner of the second aspect of the embodiment of the present disclosure, in a fourth possible implementation manner of the embodiment of the present disclosure, the shared configuration unit is further configured to, when the shared communication manner determining unit determines that the current communication manner of the virtual machine is not the manner of sharing the physical network interface card, select, for the virtual machine, a physical network interface card whose network traffic or load is less than or equal to a preset value to perform sharing, where the preset policy includes, the network traffic or the load of the physical network interface card is less than or equal to the preset value, and change the hardware network resource in the configuration file of the virtual machine to a resource of the selected shared physical network interface card.

With reference to the second aspect of the embodiment of the present disclosure, or any one of the first to the third possible implementation manners of the second aspect, in a fifth possible implementation manner of the second aspect of the embodiment of the present disclosure, the communications device further includes an initial value setting unit configured to set an initial value of the requirement indication information corresponding to the virtual machine, a first initial configuration unit configured to configure the virtual machine whose initial value of the requirement indication information set by the initial value setting unit meets the preset pass-through condition as the virtual machine using the pass-through technology, and a second initial configuration unit configured to configure the virtual machine whose initial value of the requirement indication information set by the initial value setting unit does not meet the preset pass-through condition as the virtual machine sharing the physical network interface card.

In the embodiments of the present disclosure, in a process in which a communications device uses a virtual machine for communication, the communications device configures, according to actual requirement indication information of each virtual machine for a network resource, a manner in which the virtual machine communicates with another device using a physical network interface card as a pass-through manner or a manner of sharing the physical network interface card. Therefore, if an actual requirement of the virtual machine for the network resource is dynamically changed, the communications device may dynamically configure a communication manner corresponding to the virtual machine such that a virtual machine with a relatively low requirement for the network resource may use the manner of sharing the physical network interface card, and a virtual machine with a relatively high requirement for the network resource may use the pass-through manner, which does not cause a situation in which network resources of some virtual machines are wasted and network resources of some virtual machines are insufficient. As a result, network resources of virtual machines are properly allocated.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
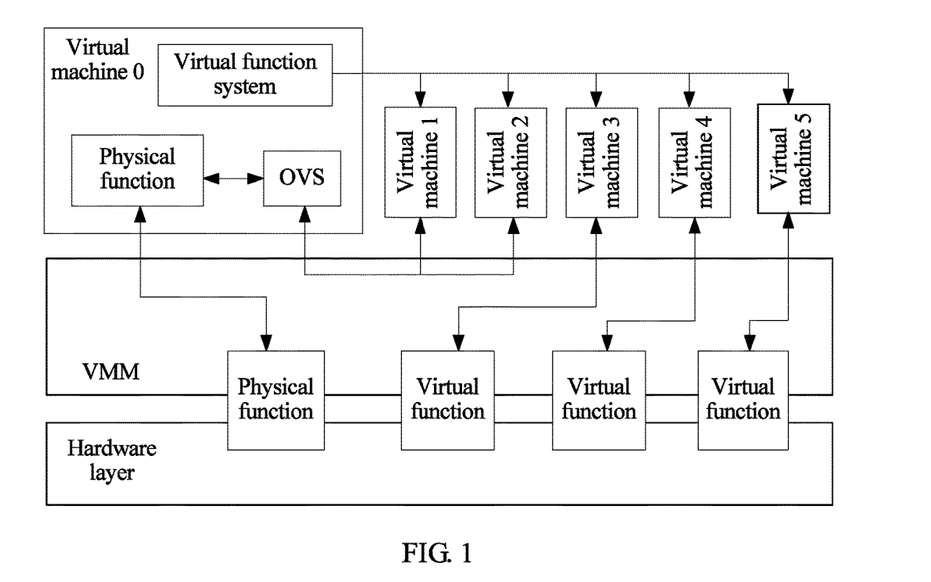
FIG. 1 is a schematic structural diagram of a communications device according to an embodiment of the present disclosure.

An embodiment of the present disclosure provides a resource configuration method of a virtual machine, which is mainly applied to a communications device described in FIG. 1. The communications device includes a hardware layer, a virtual machine monitor (VMM), and a virtual machine.

The hardware layer may include multiple (such as M) physical network interface cards. The VMM may coordinate and manage a relationship between hardware included in the hardware layer and the virtual machine, and may manage a relationship between a physical network interface card and the virtual machine. There are two manners in which the virtual machine communicates with another device using a physical network interface card (that is, a pass-through virtual function manner and a physical function manner of sharing the physical network interface card). Of multiple (such as L, L herein is greater than a quantity M of physical network interface cards) virtual machines, some virtual machines such as a virtual machine 0 may be configured to manage another virtual machine, and some other virtual machines (such as virtual machines 1 to 5) may communicate with other devices in a pass-through manner or a manner of sharing the physical network interface card. The virtual machine 0 that performs management may include a virtual function system (VFS) and a shared module of the physical network interface card, where the VFS can deliver an execution command to the virtual machine 0 to manage another virtual machine. The shared module can use a conventional OVS or a bridging manner to share the physical network interface card. The shared module shown in FIG. 1 enables, in an OVS manner, multiple virtual machines (such as virtual machines 1 and 2 shown in FIG. 1) to share a resource of the physical network interface card.

Figure 2:
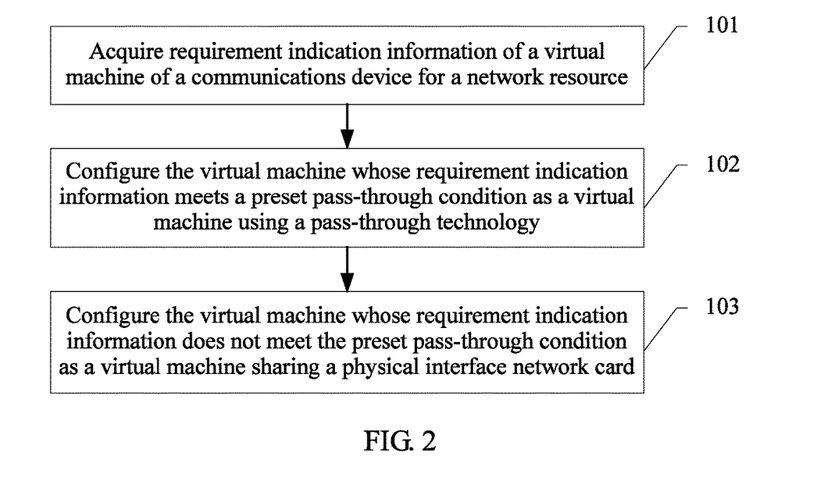
FIG. 2 is a flowchart of a resource configuration method of a virtual machine according to an embodiment of the present disclosure.

The VFS included in the virtual machine 0 that performs the management and that is in the communications device in this embodiment may configure a resource of the virtual machine using the following method. A flowchart is shown in FIG. 2, including the following steps.

Step 101: In a process in which the communications device uses the virtual machine for communication, acquire actual requirement indication information of a virtual machine of the communications device for a network resource.

The requirement indication information herein is used to indicate an actual requirement of the virtual machine for the network resource. The VFS may further acquire the actual requirement for the network resource according to a service type of data transmitted by the virtual machine. For example, if the service type of data transmitted by the virtual machine is video data, the requirement indication information of the virtual machine may be further indicated using a relatively large numerical value such as 500 million (M).

The VFS may further determine the requirement indication information of the virtual machine by default, or determine the requirement indication information of the virtual machine according to actual network traffic or load of the virtual machine. For example, if the actual load of the virtual machine is relatively heavy, the requirement indication information may indicate an actual requirement of the virtual machine for the network resource using a relatively large network bandwidth value.

Further, the VFS may acquire network traffic or load of each virtual machine of multiple virtual machines. For ease of statistics, the VFS may further calculate a hash value corresponding to the network traffic or the load of each virtual machine. In addition, the VFS may further sort the network traffic or the load of all the virtual machines in descending order.

Step 102: Configure the virtual machine whose requirement indication information meets a preset pass-through condition as a virtual machine using a pass-through technology.

The preset pass-through condition herein refers to a condition under which the virtual machine uses a pass-through manner to communicate with another device using a physical network interface card, which may further include the actual network traffic or load of the virtual machine is greater than a first threshold, or a value obtained according to the actual network traffic (or load) of the virtual machine and a specific function relationship is greater than a second threshold, or of the multiple virtual machines (such as L virtual machines), after the actual network traffic (or load) is sorted in descending order, multiple virtual machines whose network traffic (or load) ranks ahead, for example, N virtual machines whose network traffic (or load) ranks ahead, are configured as virtual machines using the pass-through technology, where N is less than a quantity M of the physical network interface cards.

It may be understood that at the beginning of creating the virtual machine by the communications device, that is, before the foregoing step 101, the VFS sets, for the virtual machine, an initial value of the requirement indication information for the network resource, where the initial value may be specified according to an initial requirement of a user, and configures the virtual machine whose initial value of the requirement indication information meets the preset pass-through condition as the virtual machine using the pass-through technology. Further, the VFS allocates a corresponding physical network interface card to the virtual machine, and maps the physical network interface card to a corresponding virtual machine, that is, the VFS stores information about the physical network interface card (including driver information, attribute information, and the like) in a corresponding virtual machine, and the VFS may further manage information such as a correspondence between the virtual machine and the physical network interface card. For example, a virtual machine 3, a virtual machine 4, and a virtual machine 5 in the communications device described in FIG. 1 all use the pass-through technology for communication. After loading drivers of corresponding physical network interface cards, these virtual machines may directly control communication between ports of the corresponding physical network interface cards and other devices.

The VFS further configures the virtual machine whose initial value of the requirement indication information does not meet the preset pass-through condition as a virtual machine sharing a physical network interface card. Further, the VFS may send instructions to virtual machines sharing physical network interface cards in order to instruct these virtual machines to share, using the shared module in the virtual machine 0 that performs the management, resources of the physical network interface cards. In addition, the VFS may further configure, for each virtual machine, periods in which network resources of the physical network interface cards are used, and the like. For example, the virtual machines 1 and 2 in the communications device described in FIG. 1 use the manner of sharing the physical network interface card for communication. These virtual machines can communicate with other devices using port information of the physical network interface card.

Figure 3:
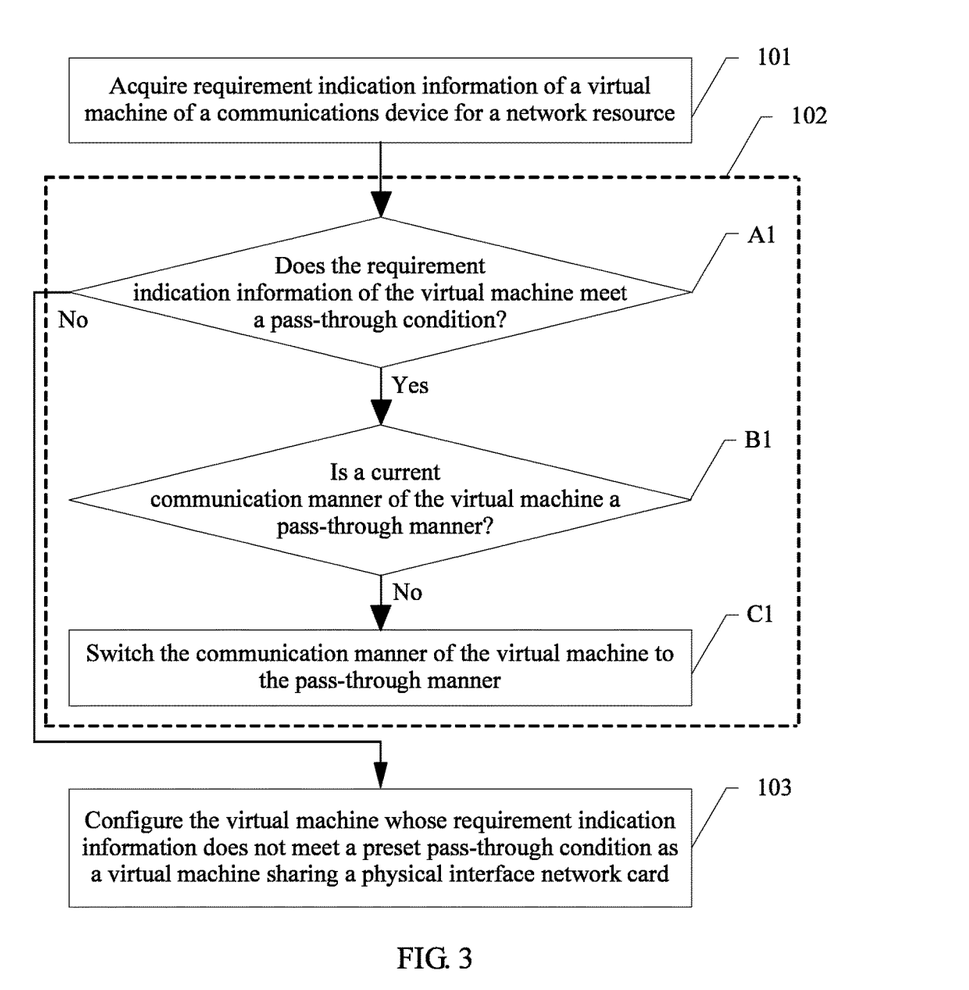
FIG. 3 is a flowchart of another resource configuration method of a virtual machine according to an embodiment of the present disclosure.

In a process in which the communications device uses each virtual machine to communicate with another device in a specific communication manner, an actual requirement of each virtual machine for a network resource is dynamically changed, and the VFS constantly and dynamically configures, according to step 101 to step 103 in this embodiment of the present disclosure, a manner in which each virtual machine communicates with another device. After performing step 101, when performing the configuration in step 102, the VFS may implement dynamic allocation of the network resource according to the following steps. A flowchart is shown in FIG. 3, including the following steps.

A1: Determine whether the requirement indication information of the virtual machine acquired in step 101 meets the preset pass-through condition. If the requirement indication information of the virtual machine acquired in step 101 meets the preset pass-through condition, step B1 is performed. If the requirement indication information of the virtual machine acquired in step 101 does not meet the preset pass-through condition, configuration in step 103 is performed.

B1: Determine whether a current communication manner of the virtual machine is a pass-through manner. If it is not the pass-through manner, step C1 is performed. If it is the pass-through manner, a communication manner of the virtual machine does not need to be changed.

C1: The communication manner of the virtual machine needs to be switched to the pass-through manner. Furthermore, the VFS may first send a command to the virtual machine in order to instruct the virtual machine to hang up, that is, to stop communication, and may invoke a virsh (virtual) interface to send the command to the virtual machine, and then allocate a corresponding physical network interface card to the virtual machine, and change a hardware network resource in a configuration file of the virtual machine to a resource of the allocated physical network interface card. In addition, the VFS may further need to create a network interface card with a virtual function for the virtual machine, that is, the VFS maps the allocated physical network interface card to the virtual machine, and further, stores information about the allocated physical network interface card in the virtual machine such that the virtual machine automatically loads the driver.

It should be noted that the VFS may store a communication status and related information that are of the virtual machine when hanging up the virtual machine such that the virtual machine can still remain a connected state after switching the communication manner and starting communication.

Step 103: Configure the virtual machine whose requirement indication information does not meet the preset pass-through condition as a virtual machine sharing a physical network interface card.

Figure 4:
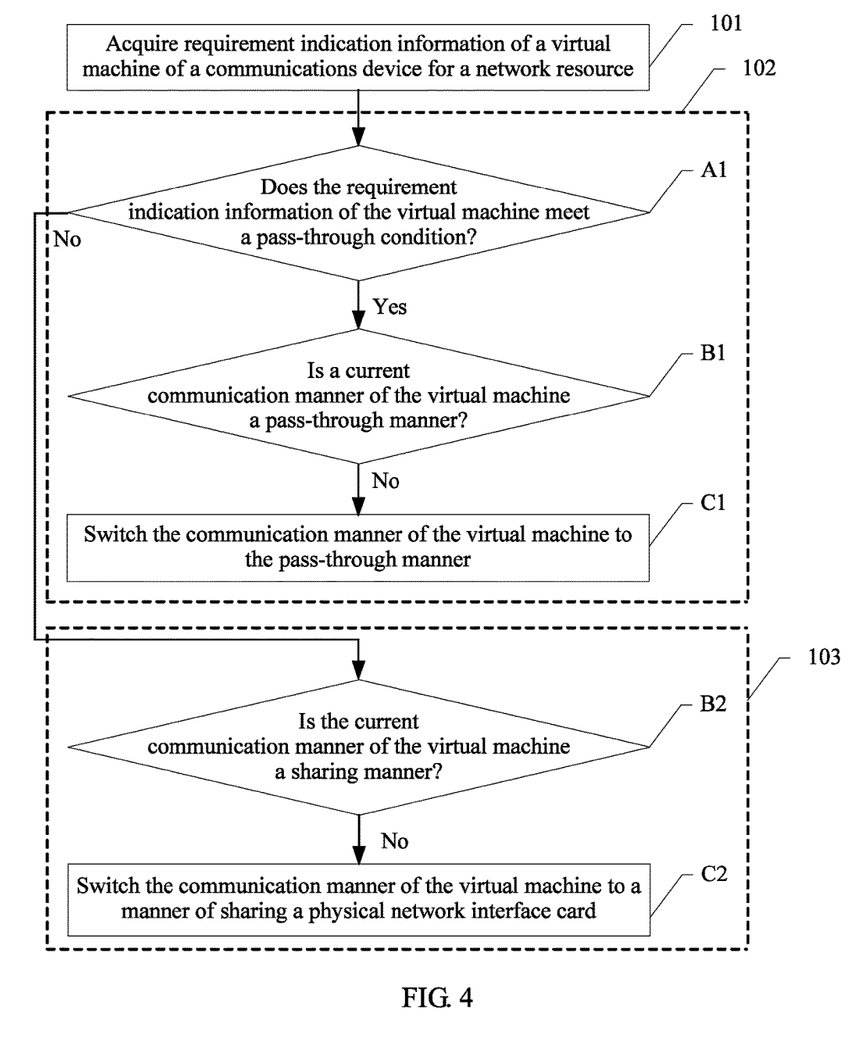
FIG. 4 is a flowchart of another resource configuration method of a virtual machine according to an embodiment of the present disclosure.

In a process in which the VFS performs step 102 according to the method shown in FIG. 3, if it is determined that the requirement indication information of the virtual machine does not meet the pass-through condition, the VFS may implement configuration in this step according to the following steps. A flowchart is shown in FIG. 4, including the following steps.

B2: Determine whether the current communication manner of the virtual machine is the manner of sharing the physical network interface card. If it is not the manner of sharing the physical network interface card, step C2 is performed. If it is the manner of sharing the physical network interface card, the communication manner of the virtual machine does not need to be changed.

C2: The communication manner of the virtual machine needs to be switched to the manner of sharing the physical network interface card. Further, the VFS may first send the command to the virtual machine in order to instruct the virtual machine to hang up, that is, to stop communication, and then change the hardware network resource in the configuration file of the virtual machine to a resource of a shared physical network interface card in the communications device. In addition, the VFS may further need to delete information about the previously mapped physical network interface card in the virtual machine. If there are multiple shared physical network interface cards that currently exist in the communications device, when switching the communication manner of the virtual machine to the manner of sharing the physical network interface card, the VFS first needs to select a shared physical network interface card for the virtual machine, and then switches the communication manner of the virtual machine to the manner of sharing the selected shared physical network interface card. Further, the VFS may select, for the virtual machine, a physical network interface card whose network traffic or load is less than or equal to a preset value to perform sharing.

Figure 5:
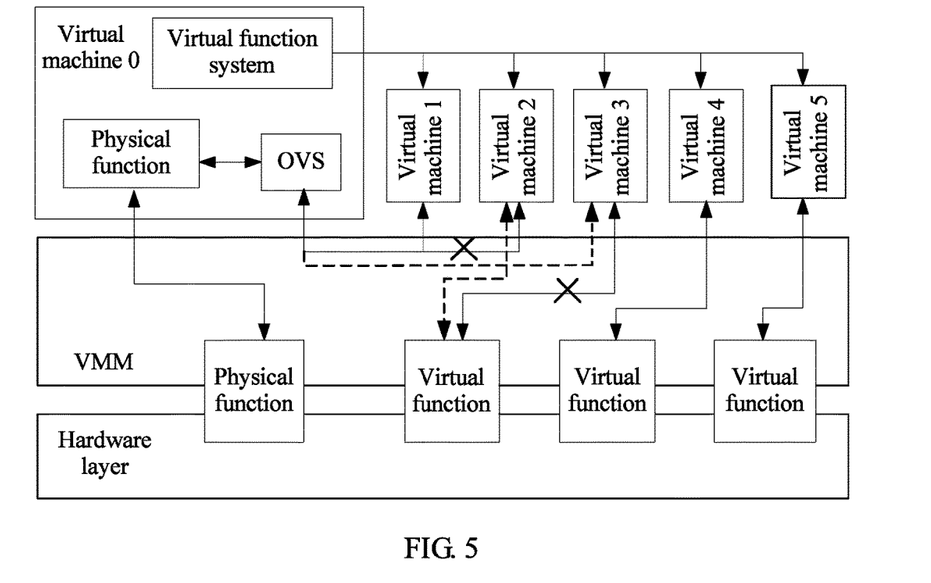
FIG. 5 is a schematic structural diagram of switching a communication manner of a virtual machine according to an embodiment of the present disclosure.

For example, as shown in FIG. 5, in a process in which the communications device uses the virtual machine to communicate with another device, when actual requirement indication information of the virtual machine 2 for a network resource meets the preset pass-through condition, the communication manner of the virtual machine 2 needs to be changed from the communication manner of sharing the physical network interface card to a pass-through communication manner (a connection manner indicated by the dotted line arrow in FIG. 5). When actual requirement indication information of the virtual machine 3 for a network resource does not meet the preset pass-through condition, the communication manner of the virtual machine 3 needs to be changed from the pass-through communication manner to the communication manner of sharing the physical network interface card (a connection manner indicated by the dotted line arrow in FIG. 5).

It should be noted that in this embodiment, the method in this embodiment is performed using a virtual machine that performs a management operation and that is in virtual machines, and in another specific embodiment, resources of the virtual machine may be configured by a functional module that is independent of the virtual machine and that is in the communications device according to the foregoing step 101 to step 103. In addition, this embodiment of the present disclosure illustrates a resource configuration method used when a quantity of virtual machines in the communications device is greater than a quantity of physical network interface cards. However, if the quantity of virtual machines is less than the quantity of physical network interface cards, the VFS may directly allocate a corresponding physical network interface card to each virtual machine, without considering the case of sharing a physical network interface card.

It can be learned that in this embodiment of the present disclosure, in a process in which a communications device uses a virtual machine for communication, the communications device configures, according to actual requirement indication information of each virtual machine for a network resource, a manner in which the virtual machine communicates with another device using a physical network interface card as a pass-through manner or a manner of sharing the physical network interface card. Therefore, if an actual requirement of the virtual machine for the network resource is dynamically changed, the communications device may dynamically configure a communication manner corresponding to the virtual machine such that a virtual machine with a relatively low requirement for the network resource may use the manner of sharing the physical network interface card, and a virtual machine with a relatively high requirement for the network resource may use the pass-through manner, which does not cause a situation in which network resources of some virtual machines are wasted and network resources of some virtual machines are insufficient. As a result, network resources of virtual machines are properly allocated.

Figure 6:
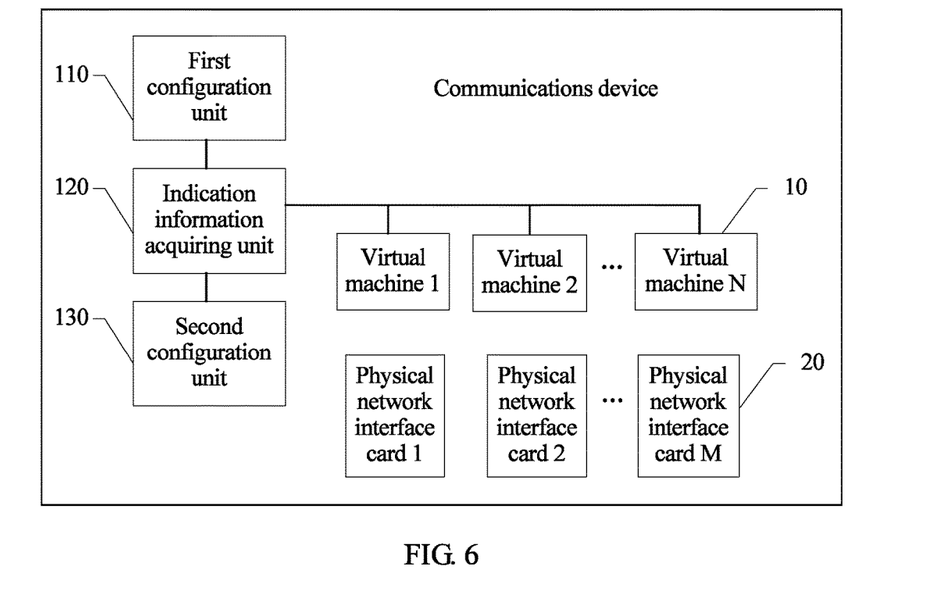
FIG. 6 is a schematic structural diagram of a communications device according to an embodiment of the present disclosure.

An embodiment of the present disclosure provides a communications device, where resources of the virtual machine in the communications device may be configured between units in the communications device according to the method shown in FIG. 2. A schematic structural diagram is shown in FIG. 6, where the communications device includes M physical network interface cards 20, N virtual machines 10, where in this situation N is greater than M, an indication information acquiring unit 120, a first configuration unit 110, and a second configuration unit 130.

The indication information acquiring unit 120 is configured to acquire requirement indication information of the virtual machine in the communications device for a network resource.

The first configuration unit 110 is configured to configure the virtual machine whose requirement indication information acquired by the indication information acquiring unit 120 meets a preset pass-through condition as a virtual machine using a pass-through technology.

The foregoing indication information acquiring unit 120 may be further configured to acquire network traffic or load of the virtual machine. In this case, the preset pass-through condition includes the network traffic or the load of the virtual machine is greater than a first threshold, or the indication information acquiring unit 120 may be further configured to acquire network traffic or load of each virtual machine, and sort the network traffic or the load of all the virtual machines in descending order, and in this case, the preset pass-through condition includes of multiple virtual machines, N virtual machines whose network traffic or load ranks ahead use the pass-through technology, where in this situation N is less than a quantity M of physical network interface cards, or the indication information acquiring unit 120 is further configured to acquire network traffic or load of each virtual machine, and calculate a hash value corresponding to the network traffic or the load of the virtual machine, and in this case, the preset pass-through condition includes the hash value corresponding to the network traffic or the load of the virtual machine is greater than a second threshold.

The second configuration unit 130 is configured to configure the virtual machine whose requirement indication information acquired by the indication information acquiring unit 120 does not meet the preset pass-through condition as a virtual machine sharing a physical network interface card.

It can be learned that in the communications device in this embodiment of the present disclosure, in a process in which the virtual machine 10 is used for communication, the first configuration unit 110 and the second configuration unit 130 configure, according to actual requirement indication information of each virtual machine for a network resource acquired by the indication information acquiring unit 120, a manner in which the virtual machine communicates with another device using a physical network interface card as a pass-through manner or a manner of sharing the physical network interface card. Therefore, if an actual requirement of the virtual machine for the network resource is dynamically changed, the communications device may dynamically configure a communication manner corresponding to the virtual machine such that a virtual machine with a relatively low requirement for the network resource may use the manner of sharing the physical network interface card, and a virtual machine with a relatively high requirement for the network resource may use the pass-through manner, which does not cause a situation in which network resources of some virtual machines are wasted and network resources of some virtual machines are insufficient. As a result, network resources of virtual machines are properly allocated.

Figure 7:
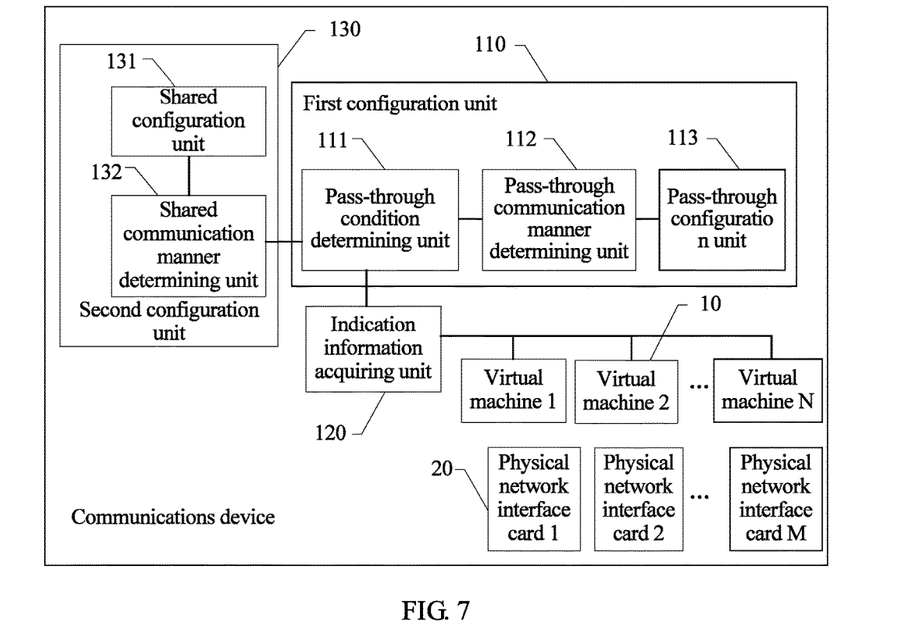
FIG. 7 is a schematic structural diagram of another communications device according to an embodiment of the present disclosure.

As shown in FIG. 7, in a specific embodiment, the communications device includes a structure shown in FIG. 6, where the first configuration unit 110 may further implement network resource configuration using a pass-through condition determining unit 111, a pass-through communication manner determining unit 112, and a pass-through configuration unit 113, and the second configuration unit 130 may implement network resource configuration using a shared configuration unit 131 and a shared communication manner determining unit 132.

The pass-through condition determining unit 111 is configured to determine whether the requirement indication information of the virtual machine acquired by the indication information acquiring unit 120 meets the preset pass-through condition.

The pass-through communication manner determining unit 112 is configured to, when the pass-through condition determining unit 111 determines that the requirement indication information of the virtual machine meets the preset pass-through condition, further determine whether a current communication manner of the virtual machine is a pass-through manner.

The pass-through configuration unit 113 is configured to, when the pass-through communication manner determining unit 112 determines that the current communication manner of the virtual machine is not the pass-through manner, allocate a corresponding physical network interface card to the virtual machine, and change a hardware network resource in a configuration file of the virtual machine to a resource of the allocated physical network interface card. Furthermore, the pass-through configuration unit 113 may first send a command to the virtual machine in order to instruct the virtual machine to hang up, that is, to stop communication, and then allocate a physical network interface card to the virtual machine and modify the configuration file. After that, the pass-through configuration unit 113 further needs to create a network interface card with a virtual function for the virtual machine, that is, the pass-through configuration unit 113 maps the allocated physical network interface card to the virtual machine, and further, stores information about the allocated physical network interface card in the virtual machine such that the virtual machine automatically loads the driver.

It should be noted that the pass-through configuration unit 113 may store a communication status and related information that are of the virtual machine when hanging up the virtual machine such that the virtual machine can still remain a connected state after switching the communication manner and starting communication.

The shared communication manner determining unit 132 is configured to, when the pass-through condition determining unit 111 determines that the requirement indication information of the virtual machine does not meet the preset pass-through condition, further determine whether the current communication manner of the virtual machine is a manner of sharing the physical network interface card.

The shared configuration unit 131 is configured to, when the shared communication manner determining unit 132 determines that the current communication manner of the virtual machine is not the manner of sharing the physical network interface card, change the hardware network resource in the configuration file of the virtual machine to a resource of a shared physical network interface card. Further, the shared configuration unit 131 may first send a command to the virtual machine in order to instruct the virtual machine to hang up, and then modify the configuration file. In addition, the shared configuration unit 131 may further delete information about the previously mapped physical network interface card in the virtual machine.

If there are multiple shared physical network interface cards that currently exist in the communications device, the shared configuration unit 131 is further configured to, when the shared communication manner determining unit 132 determines that the current communication manner of the virtual machine is not the manner of sharing the physical network interface card, select, for the virtual machine, a physical network interface card whose network traffic or load is less than or equal to a preset value to perform sharing, and change a hardware network resource in a configuration file of the virtual machine to a resource of the selected shared physical network interface card.

In this embodiment of the present disclosure, in a process in which the communications device uses the virtual machine to communicate with another device, the pass-through configuration unit 113 in the first configuration unit 110 may switch a virtual machine whose communication manner is a manner of sharing a physical network interface card to a pass-through manner. The shared configuration unit 131 in the second configuration unit 130 may switch a virtual machine whose communication manner is a pass-through manner to a manner of sharing a physical network interface card.

Figure 8:
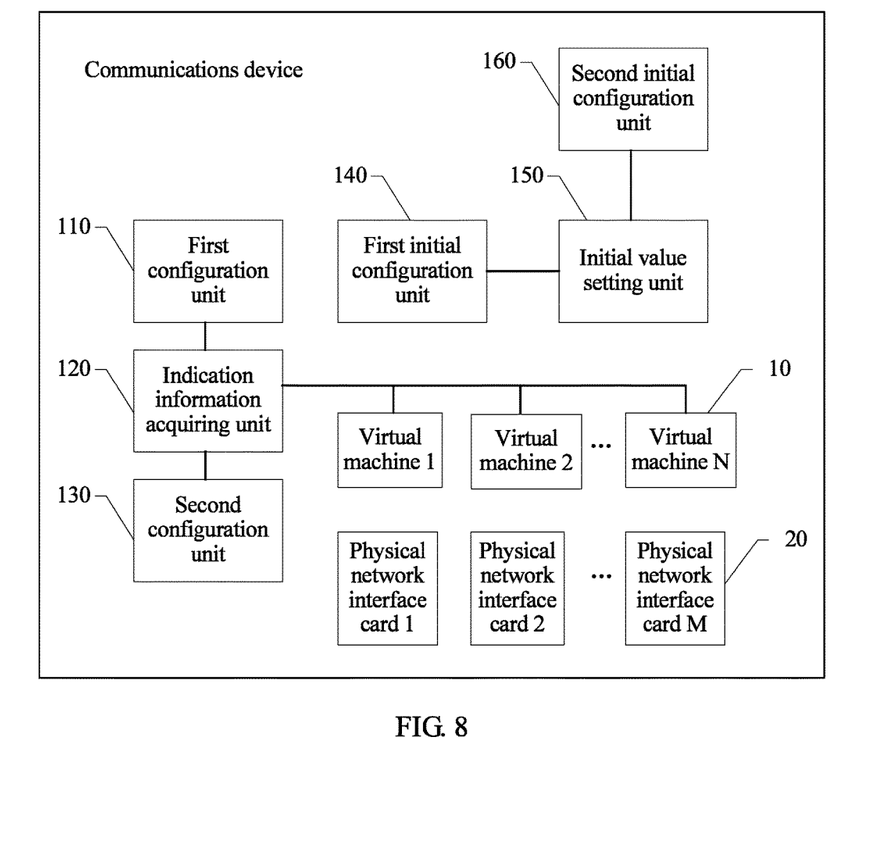
FIG. 8 is a schematic structural diagram of another communications device according to an embodiment of the present disclosure.

As shown in FIG. 8, in a specific embodiment, in addition to a structure shown in FIG. 6, the communications device may further include an initial value setting unit 150, a first initial configuration unit 140, and a second initial configuration unit 160.

The initial value setting unit 150 is configured to set an initial value of the requirement indication information corresponding to the virtual machine.

The first initial configuration unit 140 is configured to configure the virtual machine whose initial value of the requirement indication information set by the initial value setting unit 150 meets the preset pass-through condition as the virtual machine using the pass-through technology. Furthermore, the first initial configuration unit 140 may allocate corresponding physical network interface cards to these virtual machines, and map the physical network interface cards to the corresponding virtual machines, that is, the first initial configuration unit 140 stores information about the physical network interface card (including driver information, attribute information, and the like) in the corresponding virtual machine, and may further manage information such as a correspondence between each virtual machine and the physical network interface card.

The second initial configuration unit 160 is configured to configure the virtual machine whose initial value of the requirement indication information set by the initial value setting unit 150 does not meet the preset pass-through condition as the virtual machine sharing the physical network interface card. Furthermore, the second initial configuration unit 160 may send instructions to virtual machines sharing physical network interface cards in order to instruct these virtual machines to share resources of the physical network interface cards. In addition, the second initial configuration unit 160 may further configure, for the virtual machines, periods in which network resources of the physical network interface cards are used, and the like.

In the communications device in this embodiment, at the beginning of creating the virtual machine, a manner may be configured, using the initial value setting unit 150, the first initial configuration unit 140, and the second initial configuration unit 160, for multiple created virtual machines to communicate with other devices.

Figure 9:
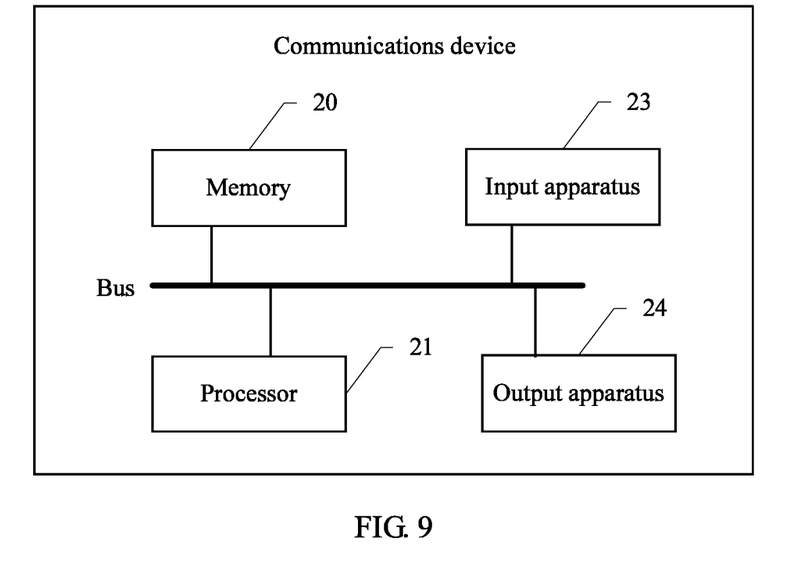
FIG. 9 is a schematic structural diagram of another communications device according to an embodiment of the present disclosure.

An embodiment of the present disclosure further provides a communications device, where resources of the virtual machine in the communications device may be configured between units in the communications device according to the method shown in FIG. 2. A schematic structural diagram is shown in FIG. 9, where the communications device includes a memory 20, a processor 21, an input apparatus 23, and an output apparatus 24 that are separately connected to a bus.

The memory 20 is configured to store data that is input from the input apparatus 23, and may further store information such as a necessary file for data processing performed by the processor 21.

The input apparatus 23 and the output apparatus 24 are communication ports between the communications device and another device, and may further include devices externally connected to the communications device, such as a display, a keyboard, a mouse, and a printer. The input apparatus 23 and the output apparatus 24 in this embodiment include M physical network interface cards.

The processor 21 in this embodiment may be configured to create multiple (such as L) virtual machines, where L is greater than M, and in a process in which the virtual machine communicates with another device using the physical network interface card, acquire requirement indication information of the virtual machine for a network resource, configure the virtual machine whose requirement indication information meets a preset pass-through condition as a virtual machine using a pass-through technology, and configure the virtual machine whose requirement indication information does not meet the preset pass-through condition as a virtual machine sharing a physical network interface card.

When acquiring the requirement indication information corresponding to the virtual machine, the processor 21 may further acquire network traffic or load of each virtual machine, and in this case, the preset pass-through condition includes the network traffic or the load of the virtual machine is greater than a first threshold, or the processor 21 may further acquire network traffic or load of each virtual machine, and sort the network traffic or the load of all the virtual machines in descending order, and in this case, the preset pass-through condition includes of the multiple virtual machines, N virtual machines whose network traffic or load ranks ahead use the pass-through technology, where N is less than M, or the processor 21 further acquires network traffic or load of the virtual machine, and calculates a hash value corresponding to the network traffic or the load of the virtual machine, and in this case, the preset pass-through condition includes the hash value corresponding to the network traffic or the load of the virtual machine is greater than a second threshold.

In a specific embodiment, at the beginning of creating the virtual machine, the processor 21 may configure a manner for the created virtual machine to communicate with another device. Further, an initial value of the requirement indication information corresponding to the virtual machine may be first set, and then the virtual machine whose initial value of the requirement indication information meets the preset pass-through condition is configured as the virtual machine using the pass-through technology. Furthermore, the processor 21 may allocate corresponding physical network interface cards to these virtual machines, and map the physical network interface cards to corresponding virtual machines, that is, the processor 21 stores information about the physical network interface cards (including driver information, attribute information, and the like) in the corresponding virtual machines, and may further manage information such as a correspondence between each virtual machine and a physical network interface card, and configure the virtual machine whose initial value of the requirement indication information does not meet the preset pass-through condition as a virtual machine sharing the physical network interface card. The processor 21 may further send instructions to the virtual machines sharing the physical network interface cards in order to instruct these virtual machines to share resources of the physical network interface cards. In addition, the processor 21 may further configure, for each virtual machine, periods in which network resources of the physical network interface cards are used, and the like.

The processor 21 is further configured to constantly acquire, in a process in which the virtual machine communicates with another device using the physical network interface card, the requirement indication information of the virtual machine for the network resource, and determine whether the requirement indication information of the virtual machine meets the preset pass-through condition. If the requirement indication information of the virtual machine meets the preset pass-through condition, the processor 21 further determines whether a current communication manner of the virtual machine is a pass-through manner. If the current communication manner of the virtual machine is a pass-through manner, the communication manner does not need to be switched. If the current communication manner of the virtual machine is not a pass-through manner, the communication manner of the virtual machine needs to be switched. Furthermore, the processor 21 may first send a command to the virtual machine in order to instruct the virtual machine to hang up, that is, to stop communication, and then allocate a corresponding physical network interface card to the virtual machine, and change a hardware network resource in a configuration file of the virtual machine to a resource of the allocated physical network interface card. In addition, the processor 21 further needs to create a network interface card with a virtual function for the virtual machine, that is, the processor 21 maps the allocated physical network interface card to the virtual machine, and further, stores information about the allocated physical network interface card in the virtual machine such that the virtual machine automatically loads the driver.

It should be noted that the processor 21 may store a communication status and related information that are of the virtual machine when hanging up the virtual machine such that the virtual machine can still remain a connected state after switching the communication manner and starting communication.

If determining that the requirement indication information of the virtual machine does not meet the preset pass-through condition, the processor 21 further needs to determine whether the current communication manner of the virtual machine is a manner of sharing the physical network interface card. If the current communication manner of the virtual machine is a manner of sharing the physical network interface card, the communication manner does not need to be switched. If the current communication manner of the virtual machine is not a manner of sharing the physical network interface card, the processor 21 needs to switch the communication manner. Furthermore, the processor 21 may first send the command to the virtual machine in order to instruct the virtual machine to hang up, and then change the hardware network resource in the configuration file of the virtual machine to a resource of the shared physical network interface card. In this case, the processor 21 may further delete information about the previously mapped physical network interface card in the virtual machine. If there are multiple shared physical network interface cards that currently exist in the communications device, the processor 21 further selects, for the virtual machine when the shared communication manner determining unit determines that the current communication manner of the virtual machine is not the manner of sharing the physical network interface card, a physical network interface card that meets a preset policy for sharing, where the preset policy includes but is not limited to the following information. Network traffic or load of the physical network interface card is less than or equal to a preset value, and a quantity of virtual machines corresponding to the physical network interface card is less than or equal to a preset value, and the like, and changes the hardware network resource in the configuration file of the virtual machine to a resource of the selected shared physical network interface card.

A person of ordinary skill in the art may understand that all or a part of the steps of the methods in the embodiments may be implemented by a program instructing relevant hardware. The program may be stored in a computer readable storage medium. The storage medium may include a read-only memory (ROM), a random-access memory (RAM), a magnetic disk, or an optical disc.

The foregoing provides a detailed description of the resource configuration method of the virtual machine and the communications device according to the embodiments of the present disclosure. Specific examples are used in this specification to illustrate the principle and implementation manners of the present disclosure. Description of the foregoing embodiments is intended only to help understand the method and core ideas of the present disclosure. In addition, a person of ordinary skill in the art may make changes to the specific implementation manners and the application scope according to the ideas of the present disclosure. In conclusion, the content of this specification shall not be construed as a limitation on the present disclosure.

What is claimed is:

1. A resource configuration method of a communications device comprising a plurality of virtual machines and a plurality of physical network interface cards, comprising:

dynamically acquiring requirement indication information of the plurality of virtual machines for a network resource;

dynamically configuring at least one first virtual machine of the plurality of virtual machines to communicate using a first physical network interface card of the plurality of physical network interface cards in a pass-through manner, wherein a requirement indication information of the at least one first virtual machine meets a preset pass-through condition; and dynamically configuring at least one second virtual machine of the plurality of virtual machines to share a second physical network interface card of the plurality of physical network interface cards, wherein a requirement indication information of the at least one second virtual machine does not meet the preset pass-through condition, wherein configuring the at least one second virtual machine to share the second physical network interface card comprises:

selecting a physical network interface card of the plurality of physical network interface cards whose network traffic or load is less than or equal to a preset value to perform sharing as the second physical network interface card; and changing a hardware network resource in a configuration file of the at least one second virtual machine to a resource of the shared second physical network interface card.

2. The resource configuration method according to claim 1, wherein acquiring the requirement indication information of the plurality of virtual machines for the network resource comprises acquiring network traffic or load of the plurality of virtual machines, and wherein the preset pass-through condition comprises the network traffic or the load is greater than a first threshold, wherein the network traffic or load of the at least one first virtual machine is greater than the first threshold.

3. The resource configuration method according to claim 1, wherein acquiring the requirement indication information of the plurality of virtual machines for the network resource comprises acquiring the network traffic or load of each virtual machine of the plurality of virtual machines, wherein the at least one first virtual machine comprises N virtual machines whose network traffic or load ranks ahead, and wherein N is less than a quantity of physical network interface cards.

4. The resource configuration method according to claim 1, wherein acquiring the requirement indication information of the plurality of virtual machines for the network resource further comprises:

acquiring the network traffic or load of each virtual machine of the plurality of virtual machines; and calculating a hash value corresponding to the network traffic or the load of each virtual machine of the plurality of virtual machines, wherein the hash value corresponding to the network traffic or the load of the at least one virtual machine is greater than a second threshold.

5. The resource configuration method according to claim 1, wherein configuring the at least one first virtual machine to communicate in the pass-through manner comprises:

changing a hardware network resource in a configuration file of the at least one first virtual machine to the resource of the first physical network interface card.

6. The resource configuration method according to claim 1, wherein before acquiring the requirement indication information of the plurality of virtual machines of the communications device for the network resource, the method further comprises:
setting an initial value of the requirement indication information corresponding to each virtual machine of the plurality of virtual machines;
configuring a virtual machine whose initial value of the requirement indication information meets the preset pass-through condition to communicate in a pass-through manner; and
configuring a virtual machine whose initial value of the requirement indication information does not meet the preset pass-through condition to share a physical network interface card.

7. A communications device for resource configuration of one or more virtual machines, comprising:
multiple physical network interface cards;
multiple virtual machines;
a memory; and
a processor, wherein the memory storing instructions which, when executed by the processor, cause the processor to be configured to:
dynamically acquire requirement indication information of the multiple virtual machines for a network resource;
dynamically configure at least one first virtual machine of the multiple virtual machines to communicate using a first physical network interface card of the multiple physical network interface cards in a pass-through manner, wherein a requirement indication information of the at least one first virtual machine meets a preset pass-through condition; and
dynamically configure at least one second virtual machine of the multiple virtual machines to share a second physical network interface card of the multiple physical network interface cards, wherein a requirement indication information of the at least one second virtual machine does not meet the preset pass-through, wherein configuring the at least one second virtual machine to share the second physical network interface card comprises:
selecting a physical network interface card of the multiple physical network interface cards whose network traffic or load is less than or equal to a preset value to perform sharing as the second physical network interface card; and
changing a hardware network resource in a configuration file of the at least one second virtual machine to a resource of the shared second physical network interface card.

8. The communications device according to claim 7, wherein the instructions further cause the processor to be configured to acquire network traffic or load of the multiple virtual machines, and wherein the preset pass-through condition comprises network traffic or the load is greater than a first threshold, wherein the network traffic or load of the at least one first virtual machine is greater than the first threshold.

9. The communications device according to claim 7, wherein the instructions further cause the processor to be configured to:
acquire the network traffic or load of each virtual machine of the multiple virtual machines, wherein the at least one first virtual machine comprises N virtual machines whose network traffic or load ranks ahead, and wherein N is less than a quantity of physical network interface cards.

10. The communications device according to claim 7, wherein the instructions further cause the processor to be configured to:
acquire the network traffic or load of each virtual machine of the multiple virtual machines; and
calculate a hash value corresponding to the network traffic or the load of each virtual machine of the multiple virtual machines, wherein the hash value corresponding to the network traffic or the load of the at least one virtual machine is greater than a second threshold.

11. The communications device according to claim 7, wherein the instructions further cause the processor to be configured to:
change a hardware network resource in a configuration file of the at least one first the virtual machine to the resource of the first physical network interface card.

12. The communications device according to claim 7, wherein the instructions further cause the processor to be configured to:
set an initial value of the requirement indication information corresponding to each virtual machine of the one or more virtual machines;
configure a virtual machine whose initial value of the requirement indication information meets the preset pass-through condition to communicate in a pass-through manner; and
configure a virtual machine whose initial value of the requirement indication information set does not meet the preset pass-through condition to share a physical network interface card.

13. A communications device, comprising:
multiple physical network interface cards;
multiple virtual machines; and
a virtual function system (VFS), wherein the VFS is configured to:
dynamically acquire requirement indication information of the multiple virtual machines for a network resource;
dynamically configure at least one first virtual machine of the multiple virtual machines to communicate using a first physical network interface card of the multiple physical network interface cards in a pass-through manner, wherein a requirement indication information of the at least one first virtual machine meets a preset pass-through condition; and
dynamically configure at least one second virtual machine of the multiple virtual machines to share a second physical network interface card of the multiple physical network interface cards, wherein a requirement indication information of the at least one second virtual machine does not meet the preset pass-through condition, wherein configuring the at least one second virtual machine to share the second physical network interface card comprises:
selecting a physical network interface card of the multiple physical network interface cards whose network traffic or load is less than or equal to a preset value to perform sharing as the second physical network interface card; and
changing a hardware network resource in a configuration file of the at least one second virtual machine to a resource of the shared second physical network interface card.

14. The communications device according to claim 13, wherein the at least one second virtual machine is configured to share the second physical network interface card using an Open vSwitch.

15. The communications device according to claim 13, wherein the VFS is configured to store information about a physical network interface card including driver information in a corresponding first virtual machine.

\* \* \* \* \*